US 6,603,749 B1

(12) United States Patent
Vejlgaard

(10) Patent No.: US 6,603,749 B1
(45) Date of Patent: Aug. 5, 2003

(54) METHOD FOR ESTIMATION OF AN IMPULSE RESPONSE OF A SIGNAL TRANSMISSION CHANNEL AND MOBILE STATION

(75) Inventor: Benny Vejlgaard, Aalborg (DK)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/395,240

(22) Filed: Sep. 13, 1999

(30) Foreign Application Priority Data

Oct. 27, 1998 (EP) .......................... 98120283

(51) Int. Cl.$^7$ ................................ H04Q 7/00
(52) U.S. Cl. .................. 370/329; 370/320; 370/321; 370/441; 370/442; 455/552; 455/553; 455/550; 375/148; 375/149; 375/150
(58) Field of Search ................ 375/147, 150, 375/148, 340, 149; 455/425, 73, 550, 552, 553, 168.1; 370/320, 321, 337, 347, 201, 441, 442, 335, 342, 465

(56) References Cited

U.S. PATENT DOCUMENTS

| | | | | |
|---|---|---|---|---|
| 5,615,208 A | * | 3/1997 | Hagmanns | 370/252 |
| 5,668,837 A | * | 9/1997 | Dent | 375/316 |
| 5,903,610 A | * | 5/1999 | Skold et al. | 375/285 |
| 5,995,499 A | * | 11/1999 | Hottinen et al. | 370/337 |
| 6,064,689 A | * | 5/2000 | Vollmer et al. | 375/149 |
| 6,144,710 A | * | 11/2000 | Chen et al. | 370/337 |
| 6,269,126 B1 | * | 7/2001 | Toskala et al. | 370/538 |
| 6,339,612 B1 | * | 1/2002 | Stewart et al. | 370/342 |

FOREIGN PATENT DOCUMENTS

DE 198 26 036 A1 12/1999

OTHER PUBLICATIONS

Communication Systems 2nd Ed. Simon Haykin,1983
Adaptive Filter Theory 2nf/d Ed. Simon Haykin, 1991
Digital Communications 3rd Ed. John G. Proakis 1995.

* cited by examiner

Primary Examiner—Nay Maung
Assistant Examiner—Sonny Trinh
(74) Attorney, Agent, or Firm—Michael J. Striker

(57) ABSTRACT

A method for estimation of an impulse response (h) of a signal transmission channel (1) in a mobile communication system and a mobile station (15), especially a mobile phone, including a device for estimating the impulse response (h) of the signal transmission channel (1) in the mobile communication system are described. The invention allows a realization of mobile stations for use in a code division multiple access (CDMA) transmission mode and in a time division multiple access (TDMA) transmission mode with less implementation complexity. The estimation device includes exactly one combined channel estimator (45). The mobile station (15) receives signals (20) transmitted via the signal transmission channel (1) either in the TDMA transmission mode or in the CDMA transmission mode. The exactly one combined channel estimator (45) estimates the impulse response (h) of the signal transmission channel (1) according to the transmission mode.

15 Claims, 3 Drawing Sheets

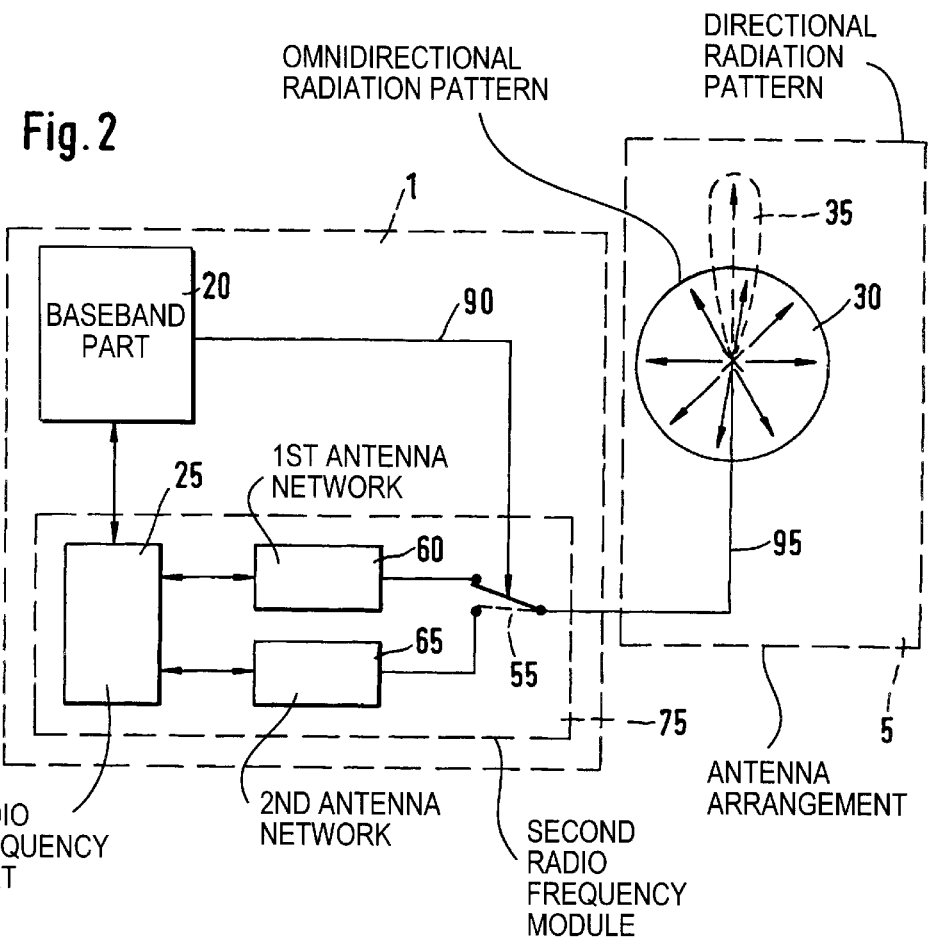
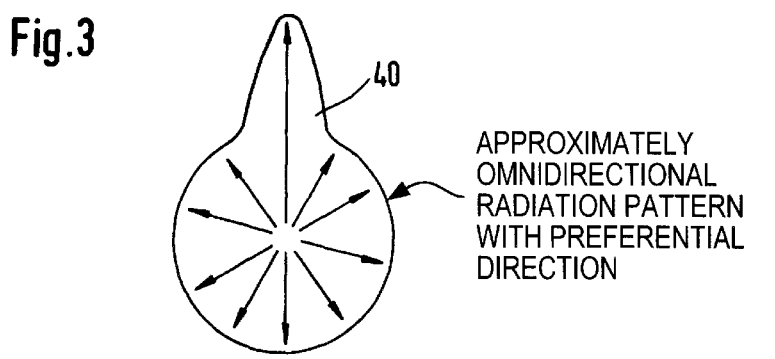

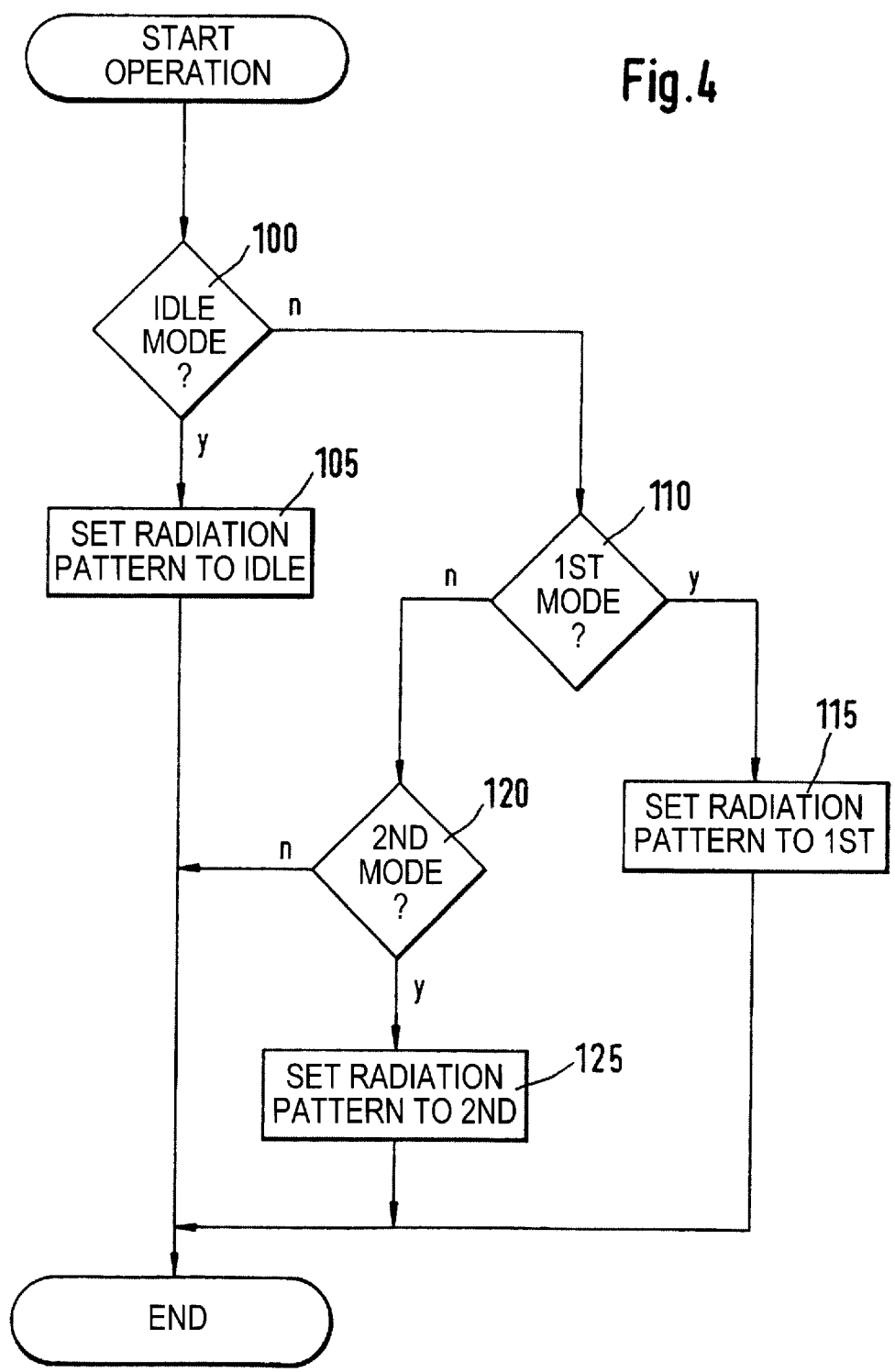

METHOD FOR ESTIMATION OF AN IMPULSE RESPONSE OF A SIGNAL TRANSMISSION CHANNEL AND MOBILE STATION

BACKGROUND OF THE INVENTION

The invention proceeds from a method for estimation of an impulse response of a signal transmission channel and a mobile station in accordance with the generic class of the independent patent claims.

According to the not yet published German patent application DE 198 26 036 it is already known to suppress distortions of a radio signal caused by multipath reception. Thereby, especially at a transmission of a radio signal in a code division multiple access (CDMA) transmission mode from a base station to a mobile station, an impulse response of a corresponding transmission channel for the multipath reception is estimated.

SUMMARY OF THE INVENTION

The method for estimation of an impulse response of a signal transmission channel and the mobile station having the characterizing features of the independent patent claims have the advantage that the complexity of the mobile station can be reduced, since there only needs to be one combined channel estimator and one channel estimation routine for the code division multiple access (CDMA) transmission mode and the time division multiple access (TDMA) transmission mode. Therefore, the implementation of a dual mode mobile station which can be used for the CDMA transmission mode as well as for the TDMA transmission mode is simplified.

The features of the dependent patent claims enable further improvement of the invention.

BRIEF DESCRIPTION OF THE DRAWING

An example of the invention is shown in the figures and explained in greater detail in the description below.

FIG. 2 is a flow chart of an algorithm for the method for estimation of the impulse response of the transmission channel according to the transmission mode, FIG. 3 shows the transmission of a signal in the TDMA transmission mode, and FIG. 4 shows the transmission of a signal in the CDMA transmission mode.

DESCRIPTION OF THE PREFERRED EMBODIMENTS

Figure 1:
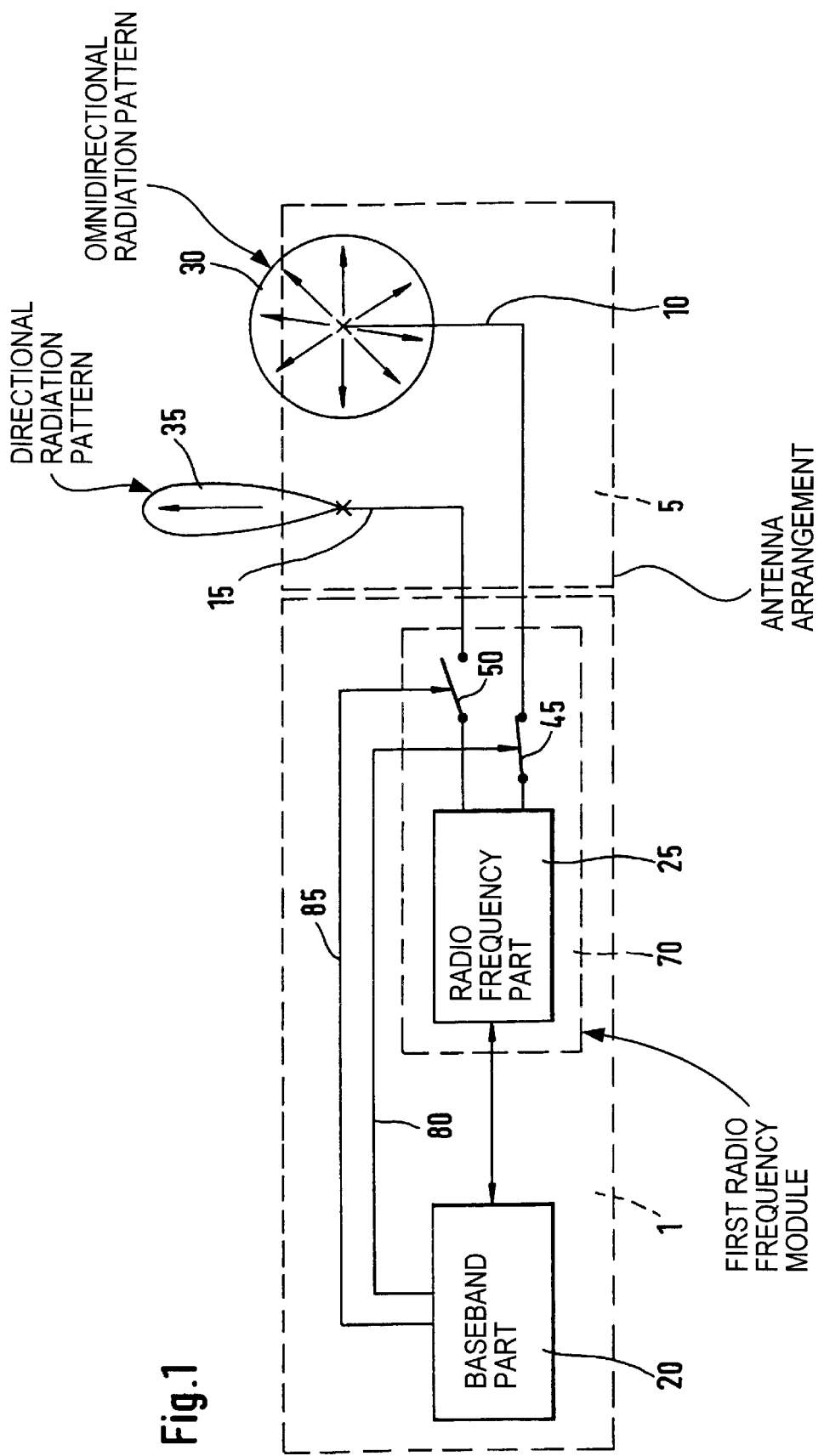
FIG. 1 is a block diagram of a mobile station according to the invention.

In FIG. 1 designates 15 a mobile station which may be realized as a mobile phone, a radio phone or the like. The mobile station 15 comprises an antenna 50 which is connected to a filter 55. Via the antenna 50, the mobile station 15 receives signals 20 which are transmitted from a base station, not shown in FIG. 1 via a signal transmission channel 1 in a mobile communication system. According to FIG. 1, two different geographic ways for transmission of the signals 20 to the mobile station 15 are indicated by different arrows. This multipath reception of the signals 20 at the mobile station 15 will cause multipath distortion of the received signals 20. The filter 55 comprises filter and mixer circuits and transforms the signals 20 into a base-band signal r. The base-band signal 5r is then input into a first equalizer 60, a second equalizer 65 and exactly one combined channel estimator 45 of the mobile station 15. A first signature reference signal 75 may be provided to the combined channel estimator 45 as well as a second signature reference signal 80. The exactly one combined channel estimator 45 of the mobile station 15 outputs an estimation for an impulse response h of the signal transmission channel 1 and provides it either for the first equalizer 60 or the second equalizer 65. An output of the first equalizer 60 and an output of the second equalizer 65 are connected to a multiplexer 70 which multiplexes the output signals of the first equalizer 60 and the second equalizer 65 to produce a multiplexed output signal d which can be decided by a decision device of the mobile station 15, whereby the decision device is not shown in FIG. 1. Further devices of the mobile station 15 for processing of the decided multiplexed output signal are also not shown in FIG. 1.

The mobile station 15 is usable for signal transmission in a code division multiple access (CDMA) transmission mode as well as in a time division multiple access (TDMA) transmission mode. The transmission mode utilized for signal transmission between the base station and the mobile station 15 is communicated to the mobile station 15 by the base station at the beginning of the signal transmission. A control unit of the mobile station 15 which is not shown in FIG. 1 activates the first equalizer 60, if signal transmission in the TDMA transmission mode is provided. If signal transmission in the CDMA transmission mode is provided, the control unit activates the second equalizer 65.

In order to compensate for the multipath distortion of the received signals 20 at the mobile station 15, it is necessary to know the impulse response h of the signal transmission channel 1. An estimation of the impulse response h is normally accomplished using so-called signature bits 5 which are multiplexed into the transmitted signals 20. Another possibility to estimate the impulse response h of the signal transmission channel 1 consists in using blind or adaptive algorithms.

In the following, an example is described for the estimation of the impulse response h using the signature bits 5. In the TDMA transmission mode, the signal 20 transmitted to the mobile station 15 is divided in time slots 35, 40 according to FIG. 3. In FIG. 3, a first time slot 35 and a second time slot 40 are shown as an example on a time axis t. Each time slot 35, 40 comprises two information bit sections 30 with information bits 10. The signature bits 5 are transmitted as a signature bit sequence 25 multiplexed or embedded between the two information bit sections 30 of the corresponding time slots 35, 40. As the timing of the time slots 35, 40 and the length of the information bits sections 30 and the signature bit sequences 25 are predetermined and known at the mobile station 15, the timing of the signature bit sequences 25 in the corresponding time slots 35, 40 according to the TDMA transmission mode is also known at the mobile station 15 and especially at the combined channel estimator 45.

In the CDMA transmission mode, the information bits 10 and the signature bits 5 can be code multiplexed and/or time multiplexed. An example for a time multiplexed signal 20 in the CDMA transmission mode is shown in FIG. 4. According to FIG. 4 the signature bit sequences 25 with the signature bits 5 and the information bit sections 30 with 5 the information bits 10 are multiplexed in a way that each information bit section 30 is embedded into two signature bit sequences 25 and each signature bit sequence 25 is embedded between two information bit sections 30. Thereby the information bit sections 30 and the signature bit sequences 25 are arranged according to FIG. 4 on the time axis t with predetermined lengths which are known at the mobile station 15. Therefore, the timing of the signature bit sequences 25 in the CDMA transmission mode is also known at the mobile station 15 and especially in the combined channel estimator 45.

As the timing of the signature bit sequences 25 is known in the combined channel estimator 45 for the TDMA transmission mode as well as for the CDMA transmission mode, the signature bit sequences 25 can be extracted out of the signals 20 received from the antenna 50 and transformed into the base-band by the filter 55, whereby the actual transmission mode for the transmission of signals 20 between the base station and the mobile station 15 is known in the combined channel estimator 45 from the control unit of the mobile station 15. Therefore, in the TDMA transmission mode, the signature bits 5 are extracted out of the transmitted signals 20 by the combined channel estimator 45 dependent on their timing in the corresponding time slots 35, 40 shown for example in FIG. 3. In the CDMA transmission mode the signature bits 5 are extracted out of the transmitted signals 20 by the combined channel estimator 45 dependent on their timing shown for example in FIG. 4.

Additionally or alternatively, in the CDMA transmission mode the signature bits 5 may be transmitted code multiplexed with the information bits 10 in the transmitted signals 20. The coding of the signature bits 5 for 5 transmission in the CDMA transmission mode is also predetermined and known at the mobile station 15 especially in the combined channel estimator 45, so that the signature bits 5 may also be extracted out of the transmitted signals 20 by the combined channel estimator 45 dependent on their coding in the CDMA transmission mode. The control unit of the mobile station 15 communicates especially at the beginning of signal transmission between the base station and the mobile station 15 the utilized transmission mode to the combined channel estimator 45 such that the combined channel estimator 45 can use the correct timing and/or coding for the extraction of the signature bits 5 out of the transmitted signals 20. In case of the use of the CDMA transmission mode, the control unit has to communicate to the combined channel estimator 45 also the kind of the CDMA transmission mode, that means if the signature bits 5 are transmitted time multiplexed and/or code multiplexed with the information bits 10. In this way, the timing and/or coding of the signature bits 5 in the transmitted signals 20 is known in the combined channel estimator 45 for the actually utilized CDMA transmission mode.

In case of the use of the TDMA transmission mode, the first signature reference signal 75 is provided to the combined channel estimator 45 and the first equalizer 60 is activated. In case of the use of the CDMA transmission mode, the second signature reference signal 80 is provided to the combined channel estimator 45 and the second equalizer 65 is activated. The combined channel estimator 45 compares the signature bit sequences 25 extracted out of the transmitted signal 20 with the corresponding signature reference signal 75, 80 of the actually utilized transmission mode. Dependent on the comparison result, the combined channel estimator 45 estimates the impulse response h of the signal transmission channel 1 and provides the estimation to the activated equalizer 60, 65.

According to the estimation of the impulse response h of the signal transmission channel 1 an impulse response e is calculated and realized for the activated equalizer 60, 65 such that $h * e \approx 1$. In this way, the influence of the signal transmission channel 1 which is the multipath distortion may be approximately compensated by the activated equalizer 60, 65 such that the output of the activated equalizer 60, 65 approximately corresponds to the information bits 10 originally sent by the base station.

If an adaptive algorithm is used for the estimation of the impulse response h of the signal transmission channel 1, the combined channel estimator 45 may be initialized by an extraction of signature bit sequences 25 at the beginning of the signal transmission between the base station and the mobile station 15. That means, that in the way described above, a first estimation for the impulse response h of the signal transmission channel 1 may be calculated during a training period. Afterwards previously received information bits 10 which were detected and equalized by the activated equalizer 60, 65 according to the first estimation and decided by the decision device not shown in FIG. 1 may be used by the combined channel estimator 45 to adapt the estimation of the impulse response h of the signal transmission channel 1 in order to track relatively slow variations in signal transmission channel characteristics during a so called decision-directed mode. The adaptation of the estimation of the impulse response h of the signal transmission channel 1 during the decision-directed mode is realized especially after completion of the training period.

The adaptive algorithm described above may be applied for every time slot 35, 40 in the TDMA transmission mode. Thereby, the estimation of the impulse response h of the signal transmission channel 1 is first initialized by the combined channel estimator 45 using the signature bit sequence 25 in every time slot 35, 40 in the above-described manner during the training period. The information bits 10 before and after the signature bit sequence 25 in the corresponding time slot 35, 40 are saved in a memory of the mobile station 15 not shown in FIG. 1. A first one of the information bits 10 of the corresponding time slot 35, 40 will then be detected an equalized based upon the initialized estimation of the impulse response h of the signal transmission channel 1. All further information bits 10 of the corresponding time slot 35, 40 will then be detected and equalized by the activated first equalizer 60 based upon an adaptive estimation of the impulse response h of the signal transmission channel 1 taking account of previously detected, equalized and decided information bits 10 of the same time slot 35, 40 during the decision-directed mode.

Another possibility for the estimation of the impulse response h of the signal transmission channel 1 by the combined channel estimator 45 consists in utilizing a blind algorithm. Thereby, no signature reference signal 75, 80 is provided to the combined channel estimator 45 or signature bit sequences 25 do not exist in the transmitted signals 20.

FIG. 2 shows an algorithm for the estimation of the impulse response h of the signal transmission channel 1 during the training period. At a step 100, the control unit of the mobile station 15 checks if the TDMA transmission mode or the CDMA transmission mode is selected for signal transmission between the base station and the mobile 5 station 15. If the TDMA transmission mode is selected, the program branches to a step 105, otherwise it branches to a step 110. At step 105, the combined channel estimator 45 extracts the signature bit sequences 25 out of the transmission signal 20 dependent on the timing of the signature bits 5 in the corresponding time slots 35, 40. Afterwards the program branches to a step 115. At step 115, the first signature reference signal 75 is loaded into the combined channel estimator 45. At step 110, the combined channel estimator 45 extracts the signature bit sequences 25 out of the transmitted signals 20 dependent on the timing and/or coding of the signature bits 5 in the transmitted signals 20. Afterwards the program branches to a step 120. At step 120, the second signature reference signal 80 is loaded into the combined channel estimator 45. After step 115 and after step 120, the program branches to a step 125. At step 125, the combined channel estimator 45 compares the loaded signature reference signal 75, 80 with the extracted signature bits 5. Afterwards, the program branches to a step 130. At step 130, the combined channel estimator 45 calculates an estimate for the impulse response h of the signal transmission channel 1. Afterwards the program is left.

The comparison of the corresponding signature reference signal 75, 80 with the extracted signature bits 5 and the calculation of the estimation for the impulse response h of the signal transmission channel 1 may be realized utilizing known algorithms as for example a least mean square algorithm as described in "Communication Systems", $2^{nd}$ edition, Simon Haykin, John Wiley & Sons, New York, 1983, a Kalman estimator as described in "Adaptive Filter Theory", $2^{nd}$ edition, Simon Haykin, Prentice Hall, 1991, a correlator estimator or the like.

As it concerns the CDMA transmission mode, the second equalizer 65 may be realized as a RAKE receiver as described in "Digital Communications", 3rd edition, John G. Proakis, McGraw-Hill, New York, 1995.

I claim:

1. Method for estimation of an impulse-response (h) of a signal transmission channel (1) in a mobile communication system, said method comprising the steps of:
    a) transmitting signals (20) via the signal transmission channel (1) either in a time division multiple access (TDMA) transmission mode or in a code division multiple access (CDMA) transmission mode;
    b) receiving said signals (20) at a mobile station (15), wherein said mobile station is provided with means for receiving said signals in said time division multiple access transmission mode and means for receiving said signals in said code division multiple access transmission mode; and
    c) estimating the impulse response (h) of the signal transmission channel (1) by means of exactly one combined channel estimator (45) at the mobile station (15) according to the transmission mode.

2. The method as defined in claim 1, further comprising transmitting signature bits (5) and information bits (10) in the signals (20), extracting signature bits (5) from the signals (20) by means of said exactly one combined channel estimator (45) of the mobile station (15) according to the transmission mode, and wherein the estimating of the impulse response (h) of the signal transmission channel (1) by means of the exactly one combined channel estimator (45) occurs according to said signature bits (5) for said transmission mode extracted during the extracting.

3. The method as defined in claim 2, wherein the signature bits (5) are transmitted as a sequence (25) multiplexed between two information bit sections (30) of a time slot (35, 40), respectively in the TDMA transmission mode during the transmitting of the signals, and wherein the signature bits (5) are extracted out of the signals (20) by the exactly one combined channel estimator (45) according to a timing of the signature bits in said time slots (35, 40) during the extracting.

4. The method as defined in claim 2, wherein the signature bits (5) are transmitted time multiplexed in the CDMA transmission mode and/or code multiplexed with the information bits (10) during the transmitting of the signals, and the signature bits (5) are extracted out of the transmitted signals (20) by the exactly one combined channel estimator (45) according to a timing and/or a coding during the extracting.

5. The method as defined in claim 2, 3 or 4, wherein at least during a training period said estimating of the impulse response (h) of the transmission channel (1) occurs by comparing said signature bits (5) received in the exactly one combined channel estimator (45) with a predetermined signature reference signal (75, 80) according to the transmission mode.

6. The method as defined in claim 1, wherein at least during a decision-directed mode said estimating of the impulse response (h) of the transmission channel (1) occurs according to a decision based on previously received information bits (10).

7. The method as defined in claim 6, wherein said decision-directed mode occurs after completion of a training period.

8. A mobile station (15) comprising means for receiving signals (20) transmitted via a signal transmission channel (1) in a mobile communication system, either in a time division multiple access (TDMA) transmission mode or in a code division multiple access (CDMA) transmission mode; and estimation means for estimating an impulse response (h) of said signal transmission channel (1), wherein the estimation means comprises exactly one combined channel estimator (45) that estimates the impulse response (h) of the signal transmission channel (1) according to the transmission mode;

wherein said mobile station comprises means for receiving said signals transmitted via said signal transmission channel (1) in said time division multiple access transmission mode and means for receiving said signals transmitted via said signal transmission channel (1) in said code division multiple access transmission mode.

9. The mobile station (15) as defined in claim 8, wherein said signals (20) comprise signature bits (5) and information bits (10) and said signals are received by the exactly one combined channel estimator (45), said exactly one combined channel estimator (45) comprises means for extracting the signature bits (5) from said signals (20) according to the transmission mode, and that the exactly one combined channel estimator (45) estimates the impulse response (h) of the signal transmission channel (1) as defined in the signature bits (5) extracted by the means for extracting for the corresponding transmission mode.

10. The mobile station (15) as defined in claim 9, wherein in the TDMA transmission mode the exactly one combined channel estimator (45) extracts the signature bits (5) from said signals (20) according to a timing of said signature bits (5) in time slots (35, 40) provided in said signals, whereby the signature bits (5) are transmitted as a sequence (25) multiplexed between two information bit sections (30) provided in said time slots (35, 40), respectively.

11. The mobile station (15) as defined in claim 9, wherein in the CDMA transmission mode said exactly one combined channel estimator (45) extracts the signature bits (5) from said signals (20) according to timing and/or coding of said signature bits (5) in said signals and said signature bits (5) are transmitted time multiplexed and/or code multiplexed with the information bits (10).

12. The mobile station (15) as defined in claim 8, 9 or 10, wherein the exactly one combined channel estimator (45) estimates the impulse response (h) of the transmission channel (1) at least during a training period by comparing the said signature bits (5) at said mobile station (15) with a predetermined signature reference signal (75, 80) according to the transmission mode.

13. The mobile station (15) as defined in claim 8, wherein the exactly one combined channel estimator (45) estimates the impulse response (h) of the transmission channel (1) according to a decision based on previously received information bits (1 0) at least during a decision-directed mode.

14. The mobile station (15) as defined in claim 13, wherein the decision-directed mode occurs only after completion of the training period.

15. The mobile station (15) as defined in claim 8, comprising a mobile phone.

\* \* \* \* \*